United States Patent [19]
Bundgart

[11] Patent Number: 6,062,734
[45] Date of Patent: May 16, 2000

[54] BEARING SEAL

[75] Inventor: Asbjörn Bundgart, Söborg, Denmark

[73] Assignee: SKF Sverige AB, Goborg, Sweden

[21] Appl. No.: 09/159,770

[22] Filed: Sep. 24, 1998

[30] Foreign Application Priority Data

Feb. 23, 1998 [SE] Sweden ................................. 9800517

[51] Int. Cl.$^7$ .................................................. F16C 33/76
[52] U.S. Cl. .......................... 384/477; 384/484; 384/486; 277/551
[58] Field of Search ..................... 384/477, 481, 384/482, 484, 485, 486; 277/551, 573, 576

[56] References Cited

U.S. PATENT DOCUMENTS

| | | | |
|---|---|---|---|
| 2,830,858 | 4/1958 | Moorman et al. | 384/484 |
| 2,834,616 | 5/1958 | Gebert et al. | 384/486 X |
| 2,873,153 | 2/1959 | Haynie | 384/484 |
| 3,519,316 | 7/1970 | Gothberg | 384/486 |
| 3,856,368 | 12/1974 | Andersen | 384/485 |
| 4,505,484 | 3/1985 | Ohkuma et al. | 384/482 X |
| 4,544,286 | 10/1985 | Basener | 384/486 |
| 4,555,188 | 11/1985 | Neal | 384/482 |
| 4,639,149 | 1/1987 | Bras et al. | 384/477 |
| 4,692,040 | 9/1987 | Ebaugh et al. | 384/484 |
| 4,872,770 | 10/1989 | Dickinson | 384/484 |
| 5,024,449 | 6/1991 | Otto | 277/353 |

FOREIGN PATENT DOCUMENTS

| | | |
|---|---|---|
| 0 241 581 | 10/1987 | European Pat. Off. . |
| 0 591 654 | 12/1992 | European Pat. Off. . |
| 460 216 | 11/1985 | Sweden . |
| 2 174 766 | 11/1986 | United Kingdom . |

*Primary Examiner*—Thomas R. Hannon
*Attorney, Agent, or Firm*—Burns, Doane, Swecker & Mathis, L.L.P.

[57] ABSTRACT

A bearing seal includes an annular body in sealing contact with the outer race of a bearing. The annular body includes a sealing resilient annular member fitted on a shield portion and projecting from the shield portion to contact in a sliding and sealing manner a sealing surface spaced apart from the bearing. The annular body is attachable to the outer race ring of the bearing by way of an annular bulge provided on the resilient member. The annular bulge is attachable by snap-action in a circumferential groove in the inner surface of the outer race ring of the bearing.

20 Claims, 5 Drawing Sheets

BEARING SEAL

This application is based on Swedish Patent Application No. 9800517-6 filed on Feb. 23, 1998, the entire content of which is incorporated herein by reference.

FIELD OF THE INVENTION

The present invention generally relates to seals. More particularly, the present invention pertains to bearing seals that are adapted to effect a sealing contact with the outer ring of a bearing and that include a resilient annular sealing member for effecting a sealing contact against a sealing surface.

BACKGROUND OF THE INVENTION

Seals for bearing arrangements are used to prevent solid contaminants and moisture from penetrating into the bearing while at the same time retaining the lubricant within the bearing or bearing arrangement. Bearing seals generally provide a minimum of friction and cause a minimum of wear while maintaining their efficiency even under the most unfavorable conditions so that bearing performance and life are not adversely affected.

Bearings can be provided with seals which are made integral with the bearing and seals which are positioned external to the bearing. Seals that are integral with the bearing are delivered in a ready sealed and lubricated condition from the manufacturer and are generally well suited for preventing penetration of contaminants from the outside in common environments.

Many factors have to be considered when choosing the right type of seal. These factors include the type of lubrication, the peripheral speed at the sealing surface, the horizontal or vertical shaft arrangement, the available space, the friction in the seal, cost and other considerations.

As mentioned above, bearing seals are commonly used to protect bearings mounted on shafts against the infiltration of dirt and water, and are particularly used in heavy environments, such as agricultural applications, heavy industries, etc. Such seals can take a variety of forms. One main type is a sliding seal which includes a sealing body of resilient material that is affixed to one of the bearing rings and at the free end has at least one sealing lip slidingly contacting the other bearing ring or a member attached to the other bearing ring. This type of seal is provided as an integral seal or as an external seal.

Another main type of seal, often used as an external seal, includes a first body connected to the rotating bearing ring and a second body connected to the stationary bearing ring. The two bodies form together a labyrinth seal designed to prevent the penetration of contaminants, moisture and lubricant. Bearing seals that are a combination of sliding seals and labyrinth seals are also used.

Depending on the construction of the seal, the resilient member can be made as a one part element, a two part element or an element made of more than two parts. A common feature is the resilient sealing lip that faces a cooperating sealing surface and in many cases is urged against the cooperating sealing surface by way of an annular spring.

Different sealing arrangements are known from EP-A1-0 241 581, EP-A2-0 519 654, and U.S. Pat. No. 5,024,449. These documents show different types of seals attached to roller bearings and ball bearings.

In environments or situations involving extraordinary quantities of contaminants, such as for example bearings used in agricultural equipment, it is preferred to utilize a particular externally mounted seal. When mounted at the manufacturer of the implement to which the bearing is associated, a knowledgeable and trained individual will typically be available to correctly mount and seal the bearing so that the bearing correctly operates to prevent external contaminants from entering the bearing. However, when it is necessary to replace these bearings, the replacement typically takes place in the field and so is not always performed by an experienced individual. There is thus the risk that the seal will be incorrectly applied, possibly leading to undue contamination of the bearing interior, and leakage or destruction of the lubricating properties. The ultimate result may be a breakdown of the bearing.

In light of the foregoing, a need exists for a bearing seal that is not susceptible to the same disadvantages and drawbacks as other known bearing seals.

It would be desirable to provide a bearing and seal combination which can be mounted and handled as a unit.

It would also be desirable to make it possible to externally secure a bearing seal to a bearing in a detachable manner and to improve the sealing properties of the bearing seal.

It would be further desirable to make it possible to provide a seal and bearing as one part at the time of primary manufacture while at the same time providing a design that facilitates replacing the seal in a simple way on after-market products when repair is necessary.

SUMMARY OF THE INVENTION

The present invention provides a bearing and bearing seal combination that includes a bearing and a seal. The bearing includes an inner race ring, an outer race ring and an annular space defined between the inner race ring and the outer race ring. The seal is in the form of a cylindrical annular body that is in sealing contact with the outer race ring of the bearing. The annular body includes an annular shield member and a resilient annular sealing member fitted to the shield member and projecting from the shield member to slidingly and sealingly contact a sealing surface to thereby sealingly bridge the annular space between the inner and outer race rings. The annular body is detachably mounted to the outer race ring by way of an annular bulge provided on the resilient member that is mounted by snap-action in a circumferential groove provided in an inner surface of the outer race ring of the bearing.

In accordance with another aspect of the present invention, a bearing and bearing seal combination includes a bearing and a seal, wherein the bearing includes an inner race ring, an outer race ring and an annular space defined between the inner race ring and the outer race ring. The seal is in the form of an annular body defined by an annular shield member and a resilient annular sealing member fitted to the shield member and projecting from the shield member to slidingly and sealingly contact a sealing surface to thereby sealingly bridge the annular space between the inner and outer race rings. The annular body includes a projection which engages a recess formed in the bearing to detachably mount the seal on the bearing.

Another aspect of the invention involves a bearing seal for sealing a bearing having an inner race ring, an outer race ring and an annular space provided between the inner and outer race rings. The bearing seal includes an annular body that is adapted to contact the outer race ring of the bearing in a sealing manner, with the annular body including an annular shield member and a resilient annular sealing member fitted to the shield member and projecting from the shield member to slidingly and sealingly contact a sealing surface to thereby sealingly bridge the annular space between the inner and outer race rings of the bearing. The resilient sealing member is provided with a bulge that is adapted to engage a groove on the inner surface of the outer race ring of the bearing to detachably mount the annular body on the bearing.

By virtue of the present invention, a seal can be readily attached to its bearing by a simple snap-in action, thereby providing a rather simple attachment of the seal, together with improved sealing capacity.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
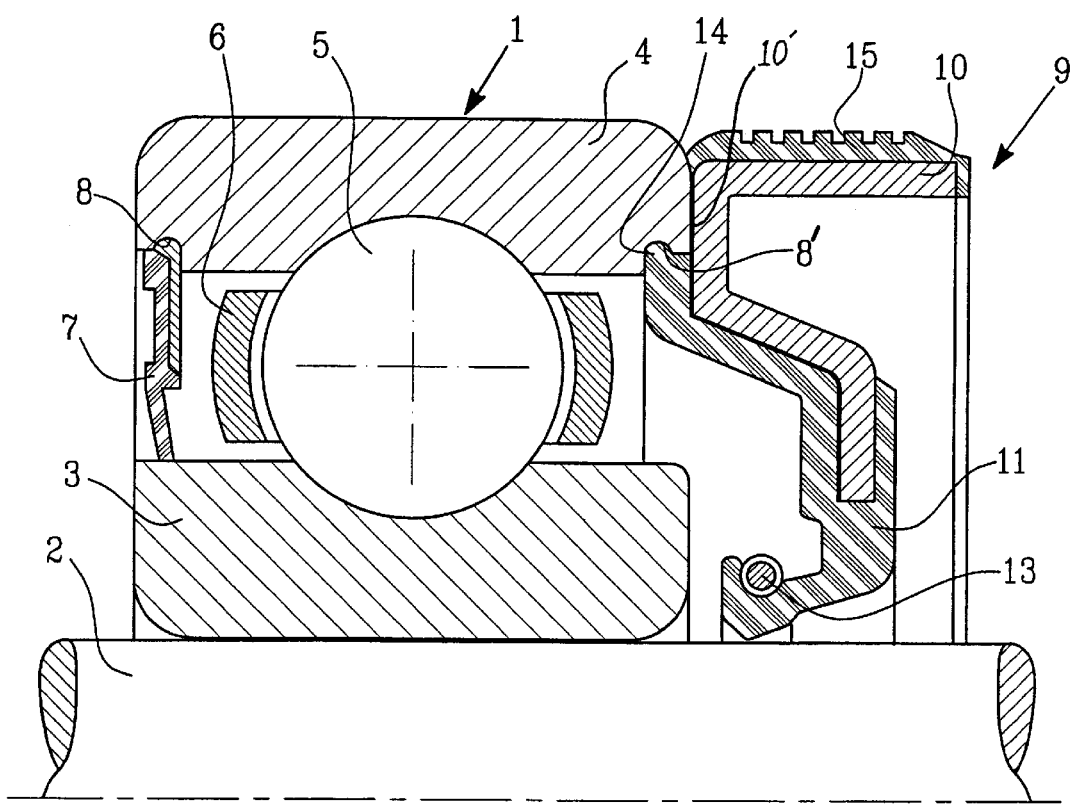
FIG. 1 is a cross-sectional view of a portion of a ball bearing provided with a bearing seal according to a first embodiment of the present invention.

With reference initially to FIG. 1, a ball bearing 1 is arranged on a shaft 2 and includes an inner race ring 3 and an outer race ring 4. A set of balls 5 is located between the two race rings 3, 4, with the balls being kept separated and guided in a cage 6. The annular space between the two race rings 3, 4 at one axial side of the bearing is sealed off by way of an integral seal 7 that is attached in a circumferential annular groove 8 provided in the inner envelope surface of the outer race ring 4 and axially outwardly of the balls 5.

A cassette seal 9 is positioned at the opposite axial side of the ball bearing 1. This cassette seal 9 is positioned outside the bearing and includes a cylindrical annular body having substantially the same outer diameter as the outer diameter of the ball bearing 1. The cylindrical annular body is adapted to effect sealing contact with the outer race ring as well as a sealing surface to thereby prevent contaminants, moisture and the like from entering the bearing. The cylindrical annular body includes an annular shield member 10 and an annular resilient member 11 that is fitted to this shield member 10. The resilient member 11 possesses an annular sealing lip 12 arranged to be in sliding and sealing contact with the outer surface of the shaft 2 when the seal is mounted to the bearing 1. An annular spring member 13 is mounted on the resilient member 11 for urging the sealing lip 12 of the resilient member 11 against the cooperating sealing surface, i.e., in this case the outer surface of the shaft 2. The shield member 10 includes a radially oriented wall portion 10' that engages one of the axially facing and radially extending end surfaces of the outer race ring 4.

The resilient member 11 has a radially outwardly facing edge at which is provided an annular bulge or projection 14. This bulge 14 is adapted to be inserted in an annular groove 8' formed on the inner surface of the outer race ring 4 by snap-action. In this way, the seal 9 is detachably retained in the groove 8' when subjected only to moderate or low external forces. The seal 9 can thus be easily attached to the bearing without the need for providing a particular mechanism or elements for attachment of the external seal to the bearing.

The radially outer edge of the annular shield portion 10 of the seal 9 is preferably provided with a resilient lining 15. This resilient lining 15 increases the gripping and sealing effect against a seat in which the bearing with the seal is to be mounted.

Figure 2:
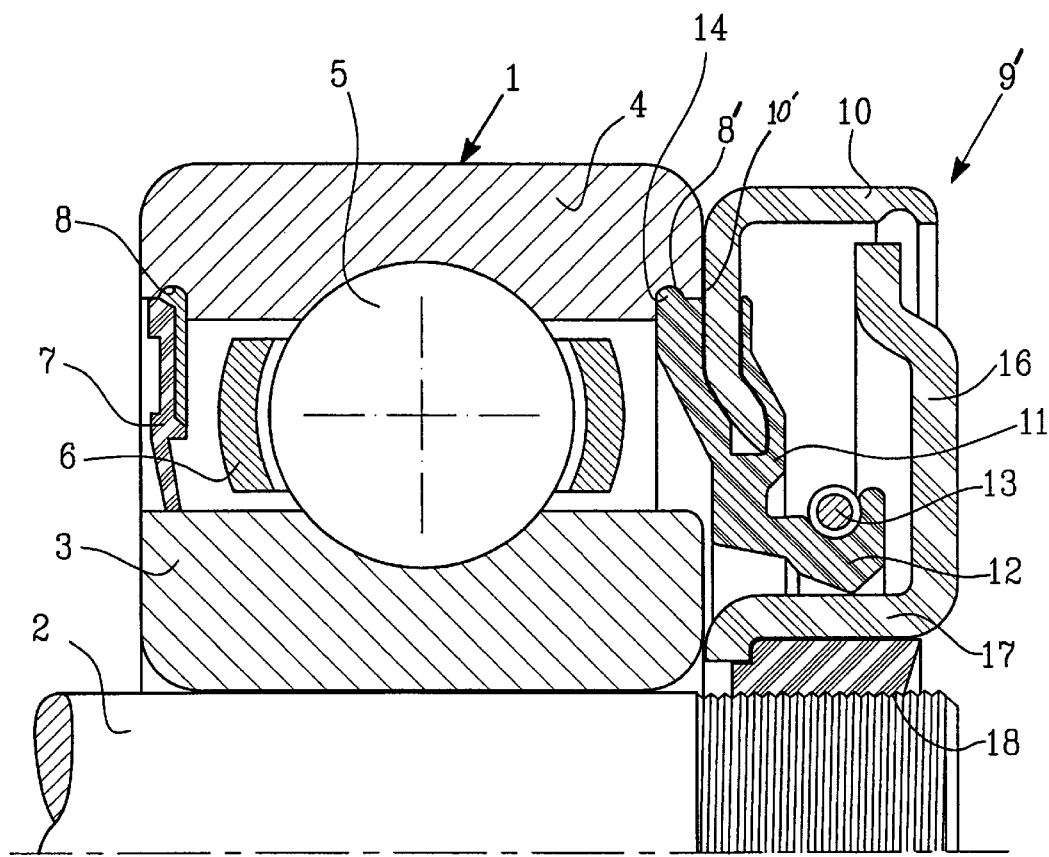
FIG. 2 is a cross-sectional view of a portion of a ball bearing provided with a bearing seal according to a second embodiment of the present invention.

FIG. 2 illustrates a slightly different embodiment of the present invention in which a bearing 1 is arranged on a shaft 2. The bearing 1 includes inner and outer race rings 3, 4, and a plurality of balls 5 guided in a cage 6 and arranged between the inner and outer race rings 3, 4. The bearing also includes an integral lip seal 7 positioned in a groove in the outer race ring 4 at one axial side of the bearing at a position located axially outwardly of the balls 5. The bearing further includes a cassette seal 9' fitted in a groove 8' at the opposite axial side of the bearing. This cassette seal 9' includes a cylindrical annular body defined by an annular shield member 10 and an annular resilient member 11 fitted to the shield member 10. The cassette seal 9' also includes a further cylindrical annular body 16 fixed to the shaft 2 by way of cooperating threads 18. The further annular body 16 possesses a generally axially extending flange 17 whose end portion is turned radially inwardly towards the shaft 2.

The shield member 10 includes a radially oriented wall portion 10' that engages one of the axially facing and radially extending end surfaces of the outer race ring 4. The resilient member 11 possesses an annular sealing lip 12 that is in sliding and sealing contact with the outer surface of the flange 17. The radially outwardly facing edge of the resilient member 11 is provided with an annular bulge or projection 14 which fits into a groove 8' formed in the inner surface of the outer race ring 4 of the bearing 1. The cassette seal 9' can thus be readily attached to the bearing 1 by a snap-action to thereby provide easy mounting and effective tight sealing. The cassette seal 9' is also detachable from the bearing.

The shield member 10, the bulge 14 and the further annular body 16 are concentrically arranged. The shield member 10 and the further annular body 16 together form a space between them in which the annular lip 12 of the resilient member 11 is positioned in sliding and sealing contact with the radially outwardly facing surface of the flange 17 of the further annular member 16. An annular spring 13 is mounted on the resilient member 11 to press the sealing lip 12 towards the sealing position against the radially outwardly facing surface of the flange 17. The resilient member 11 can be vulcanized to the annular shield member 10.

Although this embodiment illustrated in FIG. 2 includes two separate elements which are not fixedly attached to each other, the friction between the sealing lip 12 and its cooperating sealing surface 17 is sufficient enough to maintain the two elements as a unit under normal handling, and also prior to its mounting on the bearing.

Figure 3:
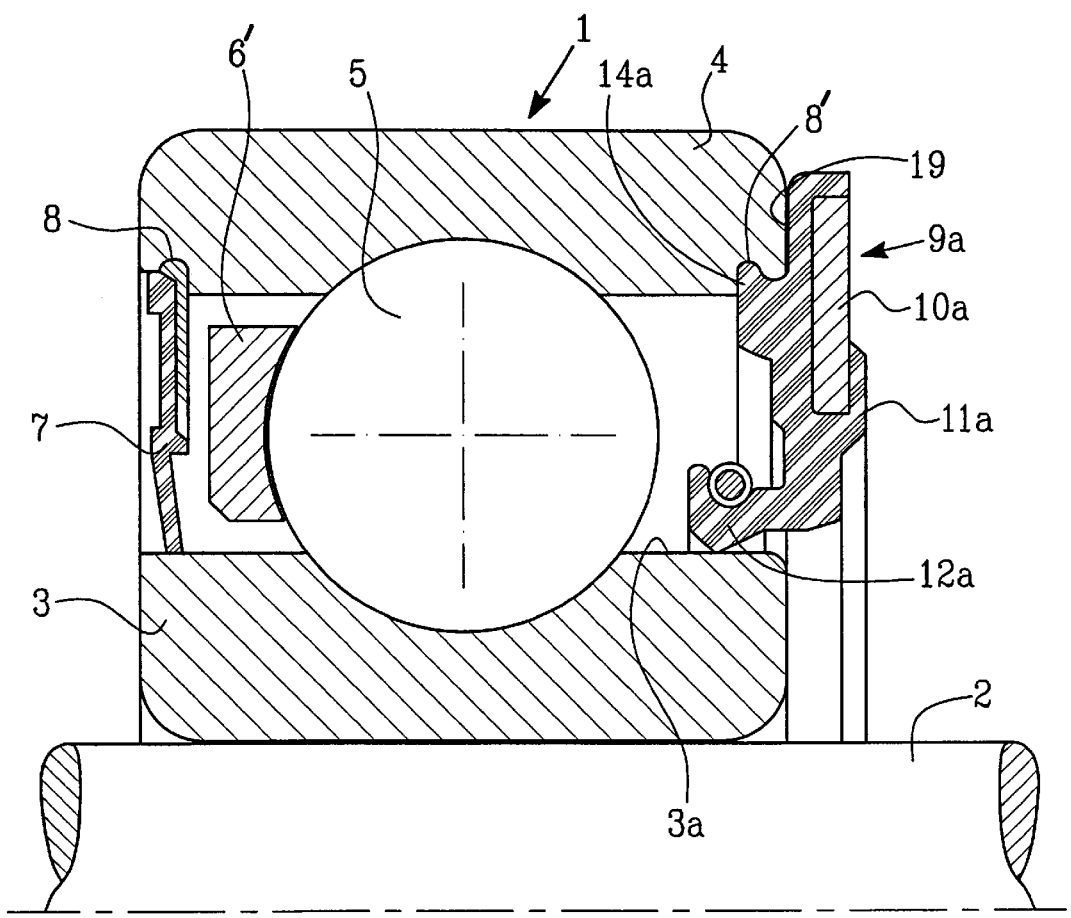
FIG. 3 is a cross-sectional view of a portion of a ball bearing provided with a bearing seal according to another embodiment of the present invention.

Another embodiment of the present invention is shown in FIG. 3. This embodiment is intended for applications which require that the sealed bearing have as small an axial width as possible. In this embodiment shown in FIG. 3, a ball bearing 1 is mounted on a shaft 2 and includes an inner race ring 3, an outer race ring 4, and a plurality of balls 5 that are provided between the race rings 3, 4 and guided by a cage 6'. In this embodiment, the cage 6' is of the type having a ring portion and a number of prongs extending axially therefrom and forming between adjacent prongs axially open pockets for the balls 5. By using such a cage, the space between the race rings 3, 4 at one axial side of the row of balls will be free from cage portions. In this way, the embodiment shown in FIG. 3 differs from the embodiments shown in FIGS. 1 and 2.

As shown in FIG. 3, one axial side of the bearing, the side towards which the ring of the cage 6' is turned, has a sealing arrangement 7, 8 corresponding to that of the previously described embodiments. At the other axial side of the bearing is provided a cassette seal 9a that includes an annular generally planar shield member 10a and an annular resilient member 11a fitted to the shield member 10 which together define a cylindrical annular body. The resilient member 11a bridges the annular space between the inner and outer race rings 3, 4.

The resilient member 11a is provided with an annular bulge or projection 14a which is received in a circumferential groove 8' formed in the inner surface of the outer race ring 4. The bulge 14a is dimensioned so that it can be inserted into the groove 8' by snap-action so that it is detachably retained in position during normal operation of the bearing.

The resilient member 11a is also provided with an annular sealing lip 12a that is arranged to slide against the inner surface 3a of the inner race ring 3. The resilient member 11a of the seal 9a is further provided with a radially extending seal portion 19 that extends radially outwardly beyond the bulge 14a. This radial seal portion 19 is axially offset from the bulge 14a far enough to allow the face of the radial seal portion 19 to engage the axial end surface of the outer race ring 4 when the bulge 14a is positioned in the groove 8'. Upon assembly of the sealed bearing, it is thus easy to inwardly push the seal to its correct position.

Figure 4:
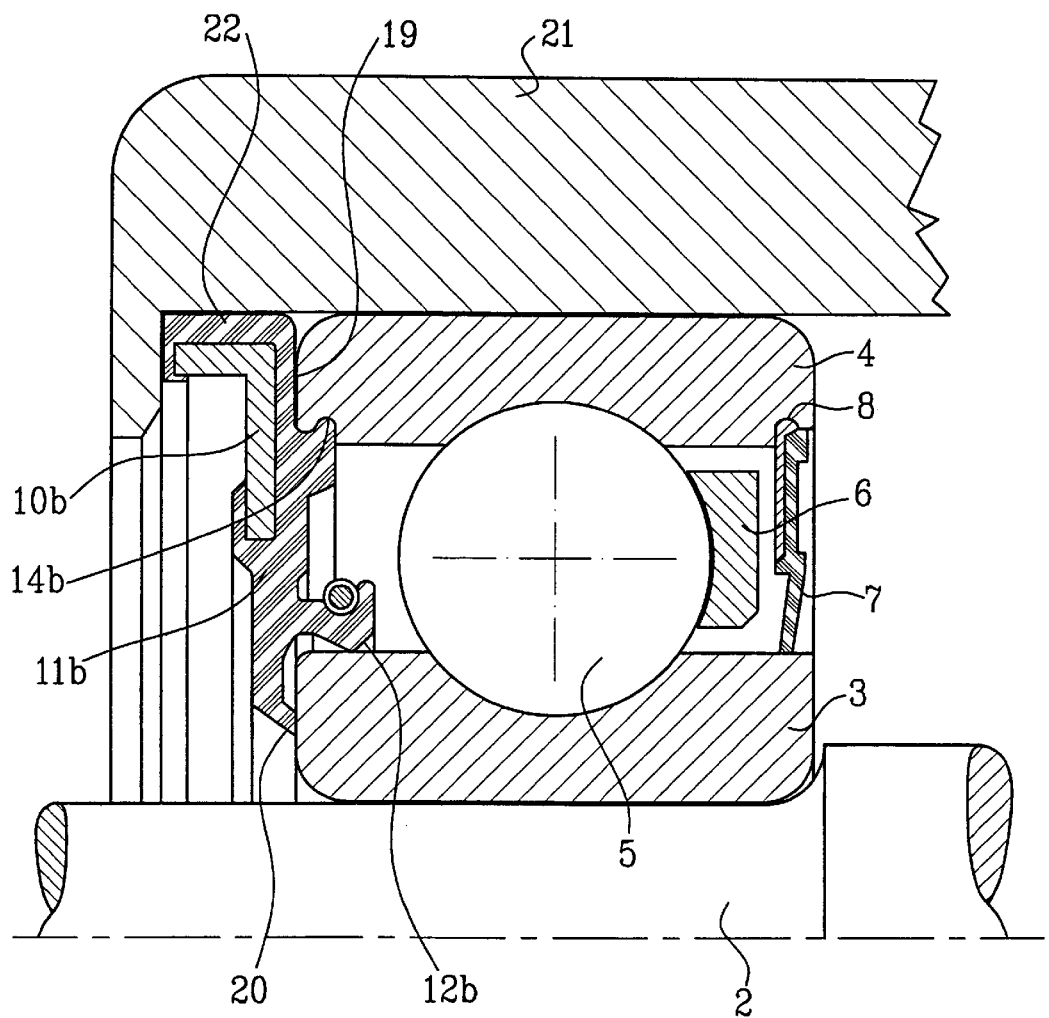
FIG. 4 is a cross-sectional view of a portion of a ball bearing provided with a bearing seal according to a further embodiment of the present invention.

FIG. 4 shows another embodiment of the sealed bearing according to the present invention in which the bearing is arranged in a housing 21, only a part of which is illustrated. This embodiment of the bearing is similar to the embodiment shown in FIG. 3 in that the FIG. 4 embodiment includes an annular shield member 10b and an annular resilient member 11b which together define a cylindrical annular body. The resilient member 11b includes an annular sealing lip 12b that sealingly engages and slides against the inner surface of the inner race ring 3 of the bearing. The resilient member 11b also include an annular bulge or projection 14b that is fitted by snap-action in an internal groove formed in the outer race ring 4. In the embodiment depicted in FIG. 4, the shield member 10b includes a radially extending leg and an axially extending leg.

The resilient member 1 1b also includes a further annular sealing lip 20 that engages the axial end surface of the inner race ring 3. A radial portion 19 of the resilient member 11 engages the axial end surface of the outer race ring 4, and the radially outermost portion of the seal is provided with an axially extending cylindrical portion 22 that engages a seat in the housing 21.

Figure 5:
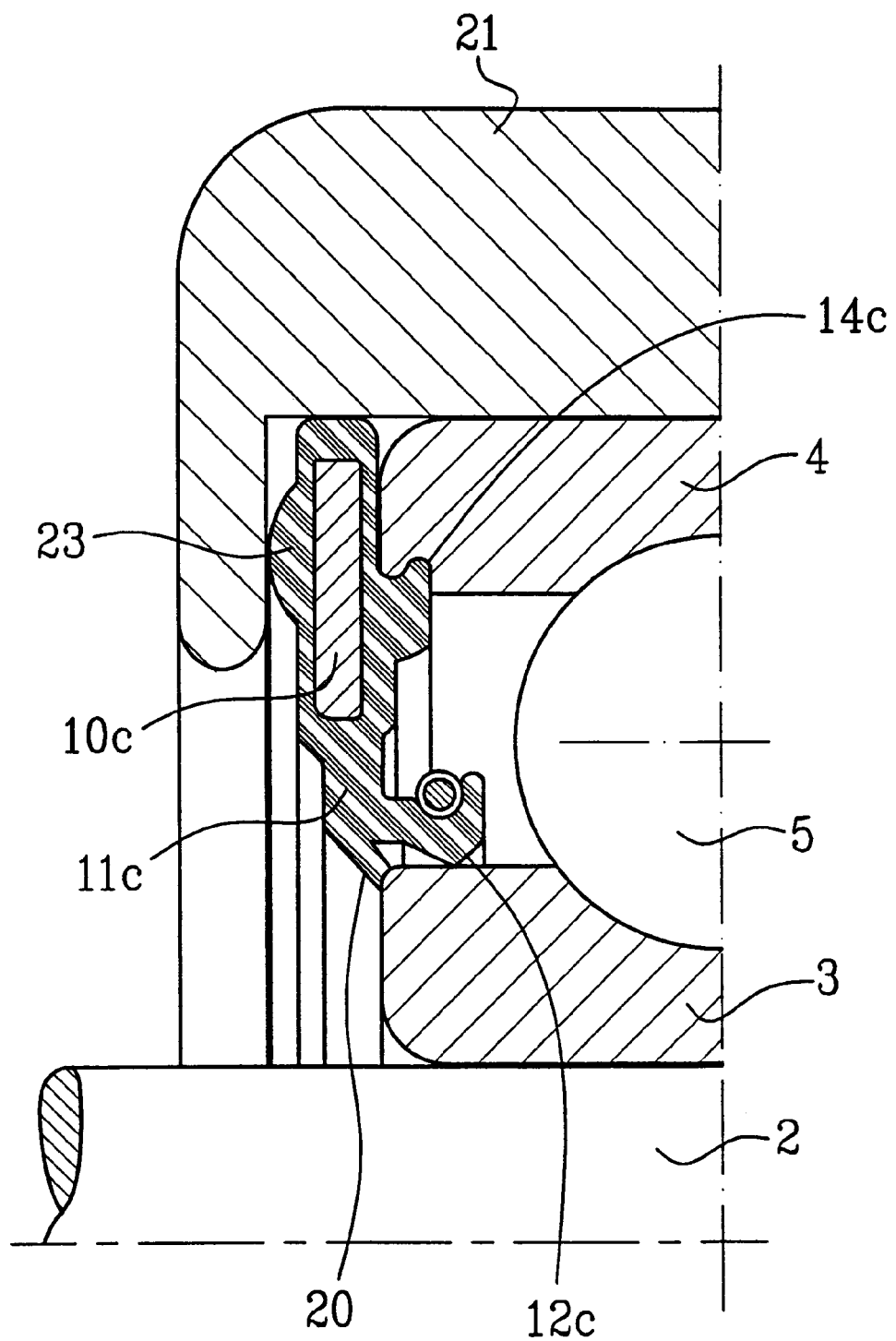
FIG. 5 is a cross-sectional view of a portion of a ball bearing provided with a bearing seal according to a still further embodiment of the present invention.

FIG. 5 shows another embodiment that is similar to the embodiment illustrated in FIG. 4, except that the seal has no cylindrical portion 22. Instead, the seal is provided with an annular bead 23 arranged to engage an axially facing surface on a radially inwardly extending portion of the housing 21 when the bearing is mounted in the housing with the seal in the correct position. In addition, the shield member 10c is in the form of a plate-shaped element that is surrounded by the resilient member 11c. The other portions of the seal shown in FIG. 5 provided with the suffix "c" are otherwise similar to or have the same function as the corresponding members having the suffix "b" in the FIG. 4 embodiment.

With the designs shown in FIGS. 4 and 5, the seated bearing unit is securely centered in the bearing housing and the engaging portions 22, 23 also provide a sealing effect which assists in preventing dirt and moisture from reaching the surface of the bearing housing in which the bearing is seated.

The present invention advantageously provides a bearing and external seal combination which can be mounted and handled as a unit. Also, the present invention makes it possible to externally secure the bearing seal to the bearing while at the same time improving the sealing properties of the bearing seal. At the time of primary manufacture, it is possible to construct the seal and bearing as one part. Moreover, the present invention provides a design that facilitates replacing the seal in a simple way on after-market products when repair is necessary. This is advantageous not only for untrained personnel during after-mounting repair or replacement, but also during manufacture of the implement to which the sealed bearing is mounted, as such a unit means easy mounting and fewer separate components to store, handle and mount.

The bearing seal of the present invention has been described in connection with a ball bearing, but it is to be understood that the seal is usable in conjunction with a great number of other types of bearings such as roller bearings, needle bearings, and others.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A bearing and bearing seal combination comprising:
   a bearing that includes an inner race ring, an outer race ring and an annular space defined between the inner race ring and the outer race ring; and
   a seal in the form of a cylindrical annular body that is in sealing contact with the outer race ring of the bearing, the annular body including an annular shield member and a resilient annular sealing member fitted to said shield member and projecting from the shield member to slidingly and sealingly contact a sealing surface to thereby sealingly bridge the annular space between the inner and outer race rings, the annular body being detachably mounted to the outer race ring by way of an annular bulge provided on the resilient member that is mounted by snap-action in a circumferential groove provided in an inner surface of the outer race ring of the bearing, the annular body being provided with a radially extending portion that is axially displaced from the annular bulge and engages an axial end surface of the outer race ring.

2. The combination as recited in claim 1, wherein the radially extending portion of the annular body that is axially displaced from the annular bulge and engages an axial end surface of the outer race ring is constituted by a portion of the resilient sealing member.

3. The combination as recited in claim 1, wherein said sealing surface is constituted by an outer surface of a shaft supported by the sealed bearing.

4. The combination as recited in claim 1, including a further cylindrical annular body in sealing contact with a shaft supported by the bearing, said further cylindrical annular body having a flange constituting said sealing surface.

5. The combination as recited in claim 4, wherein said annular body and said further cylindrical annular body are kept together as a unit by virtue of friction between the resilient annular member and said flange.

6. The combination as recited in claim 1, wherein said sealing surface is constituted by an inner surface of the inner race ring.

7. The combination as recited in claim 1, wherein said resilient sealing member has a portion extending axially outside the outer race ring, said resilient sealing member including a portion in sealing contact with a bearing housing surrounding the outer race ring.

8. A bearing and bearing seal combination comprising:
   a bearing that includes an inner race ring, an outer race ring and an annular space defined between the inner race ring and the outer race ring; and
   a seal in the form of an annular body that includes an annular shield member and a resilient annular sealing member fitted to said shield member and projecting from the shield member to slidingly and sealingly contact a sealing surface to thereby sealingly bridge the annular space between the inner and outer race rings, the annular body including a projection which engages a recess formed in a radially inwardly facing surface of the bearing to detachably mount the seal on the bearing, the annular body being provided with a radially extending portion that is axially displaced from the projection and engages an axial end surface of the outer race ring.

9. The combination as recited in claim 8, wherein the radially extending portion of the annular body that is axially displaced from the projection and engages the axial end surface of the outer race ring is constituted by a portion of the resilient sealing member.

10. The combination as recited in claim 8, including a resilient lining secured to a radially outermost surface of the shield member.

11. The combination as recited in claim 8, including a further cylindrical annular body separate from said annular body, said further cylindrical annular body having a flange constituting said sealing surface.

12. A bearing seal as recited in claim 11, wherein said annular body and said further cylindrical annular body are kept together as a unit by virtue of friction between the resilient sealing member and said flange.

13. The combination as recited in claim 8, wherein said sealing surface is constituted by an inner surface of the inner race ring.

14. The combination as recited in claim 8, wherein said annular member has a portion extending axially outside the outer race ring, said annular member including a portion in sealing contact with a bearing housing surrounding the outer race ring.

15. The combination as recited in claim 8, wherein the projection is formed on the resilient annular sealing member.

16. A bearing seal for sealing a bearing having an inner race ring, an outer race ring and an annular space provided between the inner and outer race rings, comprising:
   an annular body that is adapted to contact the outer race ring of the bearing in a sealing manner, the annular body including an annular shield member and a resilient annular sealing member fitted to said shield member and projecting from said shield member to slidingly and sealingly contact a sealing surface to thereby sealingly bridge the annular space between the inner and outer race rings of the bearing, the resilient sealing member including a bulge that is adapted to engage a groove on an inner surface of the outer race ring of the bearing to detachably mount the annular body on the bearing, the annular body being provided with a radially extending portion that is axially displaced from the annular bulge for engaging an axial end surface of the outer race ring.

17. A bearing seal as recited in claim 16, wherein the radially extending portion that is axially displaced from the bulge for engaging the axial end surface of the outer race ring of the bearing is constituted by a portion of the resilient sealing member.

18. A bearing seal as recited in claim 16, including a further cylindrical annular body separate from said annular body, said further cylindrical annular body having a flange constituting said sealing surface.

19. A bearing seal as recited in claim 18, wherein said annular body and said further cylindrical annular body are kept together as a unit by virtue of friction between the resilient sealing member and said flange.

20. A bearing seal as recited in claim 16, wherein said resilient sealing member has an axially projecting portion adapted to engage a portion of a bearing housing surrounding the outer race ring of the bearing.

* * * * *